(12) United States Patent
Yoo

(10) Patent No.: US 7,893,983 B2
(45) Date of Patent: Feb. 22, 2011

(54) MANUAL FOCUSING METHOD AND SYSTEM IN PHOTOGRAPHING DEVICE

(75) Inventor: Hang-du Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 871 days.

(21) Appl. No.: 11/373,146

(22) Filed: Mar. 13, 2006

(65) Prior Publication Data

US 2007/0002162 A1    Jan. 4, 2007

(30) Foreign Application Priority Data

Jun. 30, 2005   (KR) .................... 10-2005-0057939

(51) Int. Cl.
  *H04N 5/222*   (2006.01)
  *H04N 5/262*   (2006.01)
(52) U.S. Cl. .......................... 348/333.01; 348/240.99
(58) Field of Classification Search ............ 348/333.01, 348/240.99
  See application file for complete search history.

(56) References Cited

U.S. PATENT DOCUMENTS 5,585,844 A * 12/1996 Hieda et al. ............. 348/224.1

2003/0076437 A1* 4/2003 Karasaki et al. .......... 348/347
2003/0218687 A1* 11/2003 Sato ........................... 348/362
2005/0259161 A1* 11/2005 Lan et al. ................. 348/224.1

FOREIGN PATENT DOCUMENTS

| CN | 1460886 | 12/2003 |
| JP | 04-354274 | 12/1992 |
| JP | 11-298791 | 10/1999 |
| JP | 11-341331 | 12/1999 |
| JP | 2000-312309 | 11/2000 |
| JP | 2001-028699 | 1/2001 |
| JP | 2001-251540 | 9/2001 |
| JP | 2003-348422 | 12/2003 |
| JP | 2004-158906 | 6/2004 |

* cited by examiner

*Primary Examiner*—Sinh Tran
*Assistant Examiner*—Hung H Lam
(74) *Attorney, Agent, or Firm*—Roylance, Abrams, Berdo & Goodman, L.L.P.

(57) ABSTRACT

Disclosed are a manual focusing method and system in a photographing device, wherein the manual focusing method includes checking whether manual focusing mode for manually focusing is selected. If the manual focusing mode is selected, a window is captured which is a predetermined sized partial image taken from a photographed image. The capture image is output and displayed. Since a window captured out of the photographed image is displayed, the user is able to manually focus more accurately by reviewing the higher resolution captured image.

25 Claims, 3 Drawing Sheets

MANUAL FOCUSING METHOD AND SYSTEM IN PHOTOGRAPHING DEVICE

CROSS-REFERENCE TO RELATED APPLICATIONS

This application claims the benefits under 35 U.S.C. §119(a) from Korean Patent Application No. 2005-57939, filed on Jun. 30, 2005, the entire contents of which are hereby incorporated by reference.

BACKGROUND OF THE INVENTION

1. Field of the Invention

The present invention relates in general to a manual focusing method and system in a photographing device. More specifically, the present invention relates to a manual focusing method and system that improves focusing by capturing a window (partial image) of an image being photographed.

2. Description of the Related Art

In a photographing device for photographing a subject and storing the photographed image, focusing is an essential part of photographing to obtain a desired image of the subject. This is called focusing. The focusing can be automatically done by a photographing device. However, when the focusing is executed without involvement of the photographer (or user), a desired subject might not be accurately focused in the way the photographer wants.

This is why most of photographing devices support the automatic focusing mode as well as the manual focusing mode. In the manual focusing mode, the user executes a focusing operation by pressing manual focus buttons or rotating a manual focus ring mounted on the photographing device.

In addition, the photographing device has a display unit through which the user can see the image of a subject currently being photographed. A typically used display unit is a standard definition (SD) LCD monitor or an SD viewfinder.

Since the image shown on the display unit is merely for the user's convenience, the display unit typically does not need to have high resolution. Thus, the display unit usually displays an SD image converted from a high definition image being photographed.

However, when focusing on a subject using the manual focusing mode, the user first needs to see an image displayed on the display unit to more accurately focus on a desired subject. Therefore, it is necessary that the image shown on the display unit is sufficiently sharp to a certain extent to permit the user to manually focus properly.

Unfortunately, the SD image the display unit provides is distorted from a high resolution image captured by the camera due to some signal dropout during the image conversion process.

As a result, the user is not able to verify sharp edges in an image being photographed and therefore, has difficulty focusing accurately.

FIG. 1 is a schematic block diagram of a conventional photographing device.

As can be seen in FIG. 1, the conventional photographing device includes a lens 10, a charge-coupled device (CCD) 20, an HD camera processing unit 30, an HD codec 40, an HD media interface unit 50, media 60, a format converter 70, and a display unit 80.

The lens 10 forms the image of a subject being photographed on the CCD 20, and executes a focusing operation by moving back and forth in small amounts between the subject and the CCD 20.

The CCD 20 is a photoelectric conversion device that produces an output voltage proportional to the quantity of incident light. For instance, the CCD 20 outputs a voltage in proportion to the quantity of an incident light transmitted through the lens to the HD camera processing unit 30.

The HD camera processing unit 30 performs signal processing according to an input voltage from the CCD 20, and generates an HD signal.

The HD codec 40 compresses the HD signal generated in the HD camera processing unit 30 to be recordable in the media 60. Thus, to reproduce the HD signal from the media 60, the compressed HD signal is restored.

The HD media interface unit 50 converts the HD signal compressed by the HD codec 40 into a signal in the media recordable format. In case of reproducing the HD signal from the media, the HD media interface unit 50 performs the inversion.

The media 60 records the HD signal that is converted in the HD media interface unit 50.

The format converter 70 receives the HD signal generated in the HD camera processing unit, and converts an HD image to a downsized image with a predetermined size. For instance, if the size of the HD image is 1440*1080i, the image is downsized by the format converter 70 to 720*480i.

As a result, the produced image has a lower resolution than the HD image. The format converter 70 outputs the downsized image to the display unit 80.

The display unit 80 is formed of an SD LCD monitor 83 and/or an SD viewfinder 85, and displays the downsized image provided from the format converter 70. Then, the user views the downsized version of a photographed image on the display unit 80. By viewing the displayed image, the user can see the current focusing state or perform focusing if necessary.

However, as mentioned above, there is a problem in performing the focusing operation through the manual focusing mode, in that the user cannot focus as accurately as possible because of the lower resolution of the downsized image shown on the display unit.

SUMMARY OF THE INVENTION

It is, therefore, an object of exemplary embodiments of the present invention to provide a manual focusing method and system in a photographing device capable of displaying a sharp image on a display unit during the focusing operation through a window capture of an image being photographed.

To achieve the above objects and advantages, there is provided a manual focusing method in a photographing device. The method comprises checking whether manual focusing mode for manually focusing is selected. If the manual focusing mode is selected, the device captures a window which is a predetermined sized partial image taken from a photographed image, and outputs the captured image. The captured image is displayed to assist the user in the manual focus operation.

Preferably, the manual focusing mode selection is executed by the operation of a manual focus button or manual focus ring mounted on the photographing device.

The method further includes generating and outputting a downsized version of the photographed image if the manual focusing mode is not selected.

In an exemplary embodiment, the location of the capture image on the photographed image can be arbitrarily set.

In an exemplary embodiment, the displaying step is performed on a viewfinder or LCD monitor.

The method further includes generating and outputting a downsized version, not a captured window, of the photographed image if a predetermined amount of time has lapsed after the manual focusing mode is set.

The method further includes capturing a window of the photographed image and outputting the capture image if the manual focusing mode is selected again.

Another aspect of the present invention provides a manual focusing system in a photographing device, which includes a control unit for checking whether manual focusing mode for manually focusing is selected. A window capture unit captures a window which is a predetermined sized partial image taken from a photographed image if the manual focusing mode is selected. The captured image is outputted and displayed on a display unit.

Preferably, the manual focusing mode selection is executed by the operation of a manual focus button or manual focus ring mounted on the photographing device.

The system further preferably includes a format converter for generating and outputting a downsized version of the photographed image if the manual focusing mode is not selected.

In an exemplary embodiment, the location of the capture image on the photographed image can be arbitrarily set.

In an exemplary embodiment, the display unit is formed of a viewfinder or LCD monitor.

The system further preferably includes a format converter for generating and outputting a downsized version, not a captured window, of the photographed image if a predetermined amount of time has lapsed after the manual focusing mode is set.

In an exemplary embodiment, if the manual focusing mode is selected again, the window capture unit captures a window of the photographed image and outputs the captured image.

Still another aspect of the present invention provides a photographing device for photographing an image of a subject, focusing, and storing a desired image of the subject. The device includes a control unit for checking whether manual focusing mode for manually focusing is selected. A window capture unit captures a window which is a predetermined sized partial image taken from a photographed image if the manual focusing mode is selected, and outputs the captured image. A display unit displays the output captured image.

Preferably, the manual focusing mode selection is executed by the operation of a manual focus button or manual focus ring mounted on the photographing device.

The device of claim further preferably includes a format converter for generating and outputting a downsized version of the photographed image if the manual focusing mode is not selected.

In an exemplary embodiment, the location of the capture image on the photographed image can be arbitrarily set.

In an exemplary embodiment, the display unit is formed of a viewfinder or LCD monitor.

The device further preferably includes a format converter for generating and outputting a downsized version, not a captured window, of the photographed image if a predetermined amount of time has lapsed after the manual focusing mode is set.

In an exemplary embodiment, if the manual focusing mode is selected again, the window capture unit captures a window of the photographed image and outputs the captured image.

BRIEF DESCRIPTION OF THE DRAWINGS

The above aspects and features of exemplary embodiments of the present invention will be more apparent from the following description in conjunction with the accompanying drawings, in which.

Throughout the drawings, like reference numbers will be understood to refer to like elements, features and structures.

DETAILED DESCRIPTION OF EXEMPLARY EMBODIMENTS

Exemplary embodiments of the present invention will now be described in detail with reference to the annexed drawings. In the following description, detailed descriptions of known functions and configurations incorporated herein have been omitted for conciseness and clarity.

Figure 1:
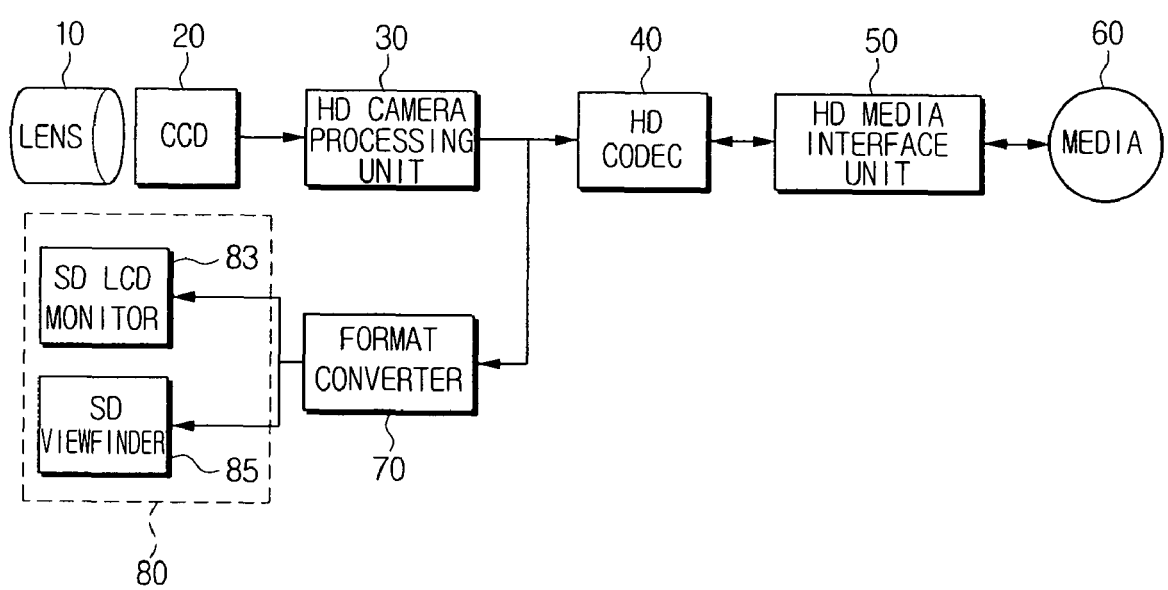
FIG. 1 is a schematic block diagram of a conventional photographing device.
Figure 2:
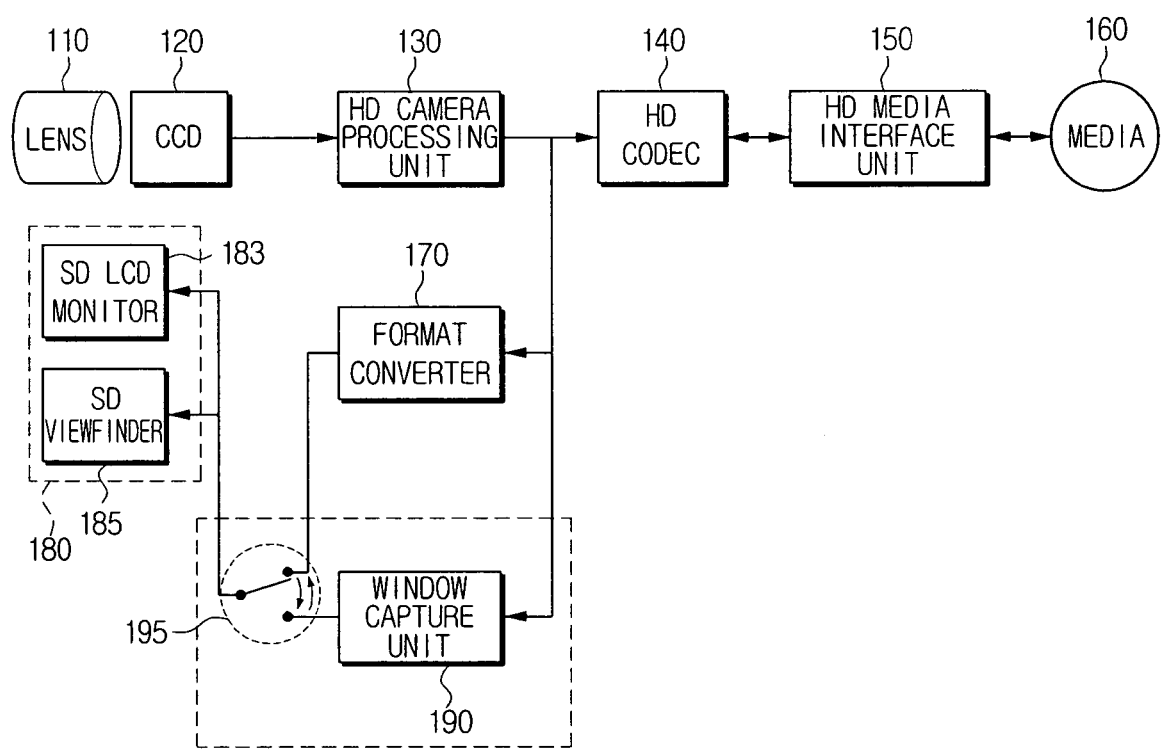
FIG. 2 is a schematic block diagram of a photographing device to which a manual focusing method according to an exemplary embodiment of the present invention is applied.

FIG. 2 is a schematic block diagram of a photographing device to which a manual focusing method according to an exemplary embodiment of the present invention is applied.

Referring to FIG. 2, the photographing device includes a lens 110, a CCD 120, an HD camera processing unit 130, an HD codec 140, an HD media interface unit 150, media 160, a format converter 170, a display unit 180, a window capture unit 190, and a switching unit 195.

The lens 110 forms the image of a subject being photographed on the CCD 120, and executes a focusing operation by moving back and forth between the subject and the CCD 120.

The CCD 120 is a photoelectric conversion device that produces an output voltage proportional to the quantity of incident light. For instance, the CCD 120 outputs a voltage in proportion to the quantity of an incident light transmitted through the lens to the HD camera processing unit 130.

The HD camera processing unit 130 performs signal processing according to an input voltage from the CCD 120, and generates an HD signal.

The HD codec 140 compresses the HD signal generated in the HD camera processing unit 130 to be recordable in the media 160. Thus, for reproducing the HD signal from the media 160, the compressed HD signal is restored.

The HD media interface unit 150 converts the HD signal compressed by the HD codec 140 into a signal in the media recordable format. In the case of reproducing the HD signal from the media, the HD media interface unit 150 performs the inversion.

The media 160 records the HD signal that is converted in the HD media interface unit 150.

The format converter 170 receives the HD signal generated in the HD camera processing unit, and converts an HD image to a downsized image with a predetermined size. As an example, if the size of the HD image is 1440*1080i, the image is downsized by the format converter 170 to 720*480i.

As a result, the produced image has a lower resolution than the HD image. The format converter 170 outputs the downsized image to the display unit 180.

The display unit 180 is formed of an SD LCD monitor 183 and/or an SD viewfinder 185, and displays the downsized image provided from the format converter 170. Then, the user checks the downsized version of a photographed image on the display unit 180. By checking the displayed image, the user can see the current focusing state or performs focusing if necessary.

The window capture unit 190 receives a manual focusing mode select signal from a control unit (not shown) in case the user presses a manual focus button or operates a manual focus ring mounted on the photographing device.

Upon receiving a signal from the control unit (not shown), the window capture unit 190 captures a window of the HD image corresponding to the HD signal from the camera processing unit 130, and outputs it to the display unit 180.

Here, the window is a predetermined sized partial image taken from the photographed image. The location of the window may be preset in the product manufacturing stage depending on the operating environment of the photographing device, or may be arbitrarily set by the user.

The switching unit 195 performs a switching operation, in response to the manual focusing mode select signal from the control unit (not shown), for the window capture unit 190 to be able to capture a window of the HD image corresponding to the HD signal from the HD camera processing unit 130 and output it to the display unit 180.

Figure 3:
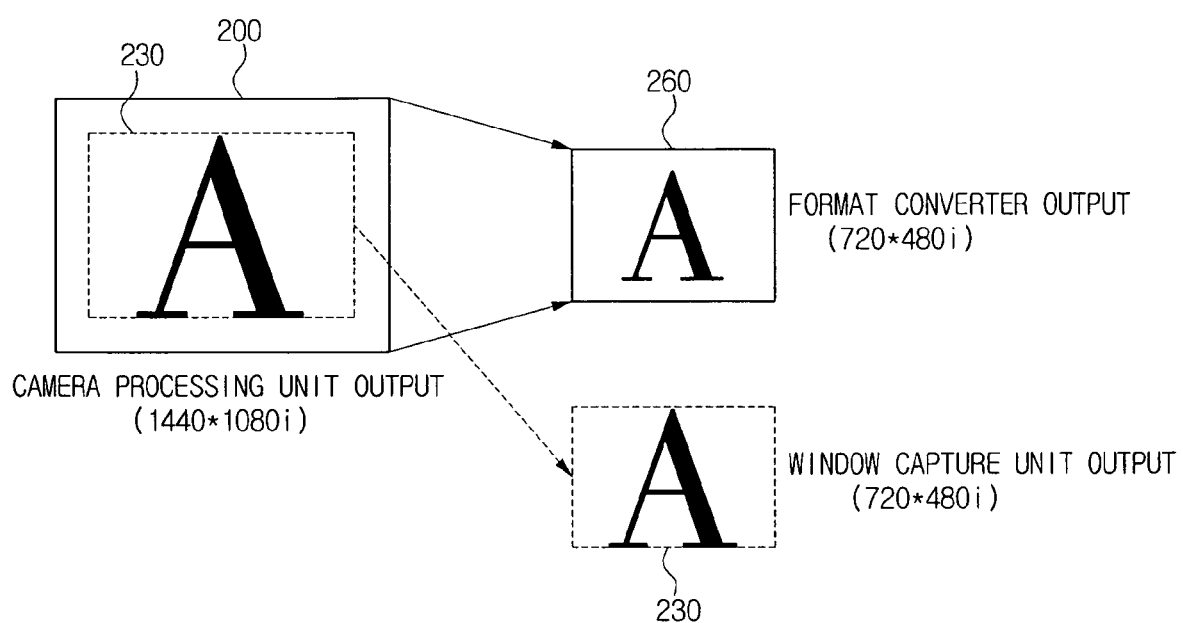
FIG. 3 is a drawing comparing an image generated by a window capture unit of an exemplary embodiment of the present invention with an image generated by a format converter.

FIG. 3 is a drawing comparing an image generated by the window capture unit of an exemplary embodiment of the present invention with an image generated by the format converter.

The basic principle behind the manual focusing method in the photographing device according to an exemplary embodiment of the present invention will now be explained with reference to FIGS. 2 and 3. First, the user turns on the photographing device and starts photographing a desired subject.

Photographing of a subject is typically accompanied with focusing. If the user did not select the manual focusing mode, the CCD 120 outputs to the HD camera processing unit 130 a voltage proportional to the quantity of an incident light transmitted through the lens 110.

Then, the HD camera processing unit 130 performs signal processing according to the input voltage from the CCD 120 and generates an HD signal. This HD signal is transmitted to the format converter 170.

The format converter converts an image corresponding to the input HD signal into a downsized image 260 of a predetermined size, and outputs the image 160 to the display unit 180.

The SD LCD monitor 183 or the SD viewfinder 185 on the display unit 180 displays the downsized image 260 provided from the format converter 170. Compared with the HD image, the downsized image 260 has lower resolution.

The following will now describe an exemplary embodiment of a manual focusing method in the photographing device, given that the user selected the manual focusing mode.

That is, when the user selected the manual focusing mode by pressing the manual focus button or operating the manual focus ring mounted on the photographing device, the control unit (not shown) inputs a manual focusing mode select signal to the window capture unit 190.

The control unit (not shown) controls the operations of the window capture unit 190 and switching unit 195, so that the image 230 generated in the window capture unit 190 can be outputted to the display unit 180.

The window capture unit 190 captures an arbitrary window on the HD image 200 corresponding to the HD signal from the HD camera processing unit 130 to generate a captured image 230. Here, the window is a predetermined sized partial image of the HD image 200. Therefore, the captured image 230 corresponds to a predetermined sized partial image 230 of the HD image corresponding to the HD signal from the HD camera processing unit 130.

For instance, if the size of the HD image 200 corresponding to the HD signal is "1440*1080i", the size of the image generated in the window capture unit 190 can be "720*480i".

Here, the size of the image generated in the window capture unit may be preset in the product manufacturing stage depending on the operating environment of the photographing device, or may be arbitrarily set by the user.

Although the image 230 generated in the window capture 190 might have the same size, "720*480i", as the downsized image 260 generated in the format converter 260, the image 230 is a captured image taken directly from the HD image 200 corresponding to the HD signal, meaning that it exhibits the same resolution as the HD image 200 when displayed on the display unit 180.

Thus, the user is able to see a photographed image with high resolution on the display unit 180, and therefore more accurate manual focusing becomes possible.

Meanwhile, if a predetermined amount of time has lapsed since the user selected the manual focusing mode, the control unit (not shown) recognizes that no more manual focusing operation is needed, so it stops the operation of the window capture 190. Again, the predetermined time may be preset in the product manufacturing stage depending on the operating environment of the photographing device, or may be arbitrarily set by the user.

That is, if the manual focus button or the manual focus ring is not operated for the predetermined amount time after the user selected the manual focusing mode by pressing the manual focus button or rotating the manual focus ring mounted on the photographing device, the control unit (not shown) recognizes that no more manual focusing is needed.

In such case, the control unit (not shown) stops the operation of the window capture unit 190, and controls the operations of the window capture unit 190 and switching unit 195, so that the image 230 generated in the window capture unit 190 stops being outputted to the display unit 180.

As such, the format converter 170 converts the HD image 200 corresponding to the HD signal from the HD camera processing unit 130 into the downsized image 260 in predetermined size, and outputs the downsized image 160 to the display unit 180. Then, the SD LCD monitor 183 or the SD viewfinder 185 on the display unit 180 displays the downsized image 260 from the format converter 170.

However, if the user operates the manual focus button or the manual focus ring later again and reselects the manual focusing mode, the control unit (not shown) resumes the operation of the window capture unit 190 and controls the operations of the window capture unit 190 and switching unit 195, so that the image 230 generated in the window capture unit 190 can be outputted to the display unit 180.

This time, however, the display unit 180 displays the captured image 230 generated in the window capture unit 190.

As explained so far, according to an exemplary embodiment of the present invention, the display unit of the photographing device displays a window image captured within the photographed image. This makes it possible for the user to manually focus with increased accuracy by checking the captured image with high resolution and high sharpness.

While the invention has been shown and described with reference to certain embodiments thereof, it will be understood by those skilled in the art that various changes in form and details may be made therein without departing from the spirit and scope of the invention as defined by the appended claims.

What is claimed is:

1. A manual focusing method in a photographing device, comprising the steps of:
   checking whether manual focusing mode for manually focusing is selected; capturing a window which is a predetermined sized partial image taken from a photographed image, and outputting the captured image if the manual focusing mode is selected;
   adjusting a size of the entire photographed image, and outputting the photographed image of which the size is adjusted if the manual focusing mode is not selected; and
   displaying one of the output captured image and the photographed image of which the size is adjusted;
   wherein in the displaying step, the photographed image of which the size is adjusted is not displayed and the output captured image is displayed during the duration of manual focusing mode, if the manual focusing mode is selected.

2. The method of claim 1, wherein the manual focusing mode selection is executed by the operation of a manual focus button or manual focus ring mounted on the photographing device.

3. The method of claim 1 further comprising the step of:
   generating and outputting a downsized version of the photographed image if the manual focusing mode is not selected.

4. The method of claim 1, wherein the location of the captured image on the photographed image can be arbitrarily set.

5. The method of claim 1, wherein the displaying step is performed on a viewfinder or LCD monitor.

6. The method of claim 1, further comprising the step of:
   generating and outputting a downsized version, not a captured window, of the photographed image if a predetermined amount of time has lapsed after the manual focusing mode is set.

7. The method of claim 6 further comprising the step of:
   capturing a window of the photographed image and outputting the captured image if the manual focusing mode is selected again.

8. A manual focusing system in a photographing device, comprising:
   a control unit for checking whether manual focusing mode for manually focusing is selected;
   a window capture unit for capturing a window which is a predetermined sized partial image taken from a photographed image if the manual focusing mode is selected, and outputting the captured image;
   a format converter for adjusting a size of the entire photographed image, and outputting the photographed image of which the size is adjusted if the manual focusing mode is not selected; and
   a display unit for displaying one of the output captured image and the photographed image of which the size is adjusted;
   wherein the display unit does not display the photographed image of which the size is adjusted and displays the output captured image during the duration of manual focusing mode, if the manual focusing mode is selected.

9. The system of claim 8, wherein the manual focusing mode selection is executed by the operation of a manual focus button or manual focus ring mounted on the photographing device.

10. The system of claim 8 further comprising:
    a format converter for generating and outputting a downsized version of the photographed image if the manual focusing mode is not selected.

11. The system of claim 8, wherein the location of the captured image on the photographed image can be arbitrarily set.

12. The system of claim 8, wherein the display unit is formed of a viewfinder or LCD monitor.

13. The system of claim 8, further comprising:
    a format converter for generating and outputting a downsized version, not a captured window, of the photographed image if a predetermined amount of time has lapsed after the manual focusing mode is set.

14. The system of claim 13, wherein, if the manual focusing mode is selected again, the window capture unit captures a window of the photographed image and outputs the captured image.

15. A photographing device for photographing an image of a subject, focusing, and storing a desired image of the subject, the device comprising:
    a control unit for checking whether manual focusing mode for manually focusing is selected;
    a window capture unit for capturing a window which is a predetermined sized partial image taken from a photographed image if the manual focusing mode is selected, and outputting the captured image;
    a format converter for adjusting the size of the entire photographed image, and outputting the photographed image of which the size is adjusted if the manual focusing mode is not selected; and
    a display unit for displaying one of the output captured image and the photographed image of which the size is adjusted;
    wherein the display unit does not display the photographed image of which the size is adjusted and displays the output captured image during the duration of manual focusing mode, if the manual focusing mode is selected.

16. The device of claim 15, wherein the manual focusing mode selection is executed by the operation of a manual focus button or manual focus ring mounted on the photographing device.

17. The device of claim 16 further comprising:
    a format converter for generating and outputting a downsized version of the photographed image if the manual focusing mode is not selected.

18. The device of claim 15, wherein the location of the captured image on the photographed image can be arbitrarily set.

19. The device of claim 15, wherein the display unit is formed of a viewfinder or LCD monitor.

20. The device of claim 15, further comprising:
    a format converter for generating and outputting a downsized version, not a captured window, of the photographed image if a predetermined amount of time has lapsed after the manual focusing mode is set.

21. The device of claim 20, wherein, if the manual focusing mode is selected again, the window capture unit captures a window of the photographed image and outputs the captured image.

22. The method of claim 1, further comprising the step of:
performing a switching operation so that one of the output captured image and the photographed image of which the size is adjusted is displayed according to whether the manual focusing mode is selected during the displaying step.

23. The method of claim 1, wherein the output captured image has the same resolution as the photographed image, and the photographed image of which the size is adjusted has a lower resolution than that of the photographed image.

24. The system of claim 8, further comprising:
a switching unit for performing a switching operation so that one of the output captured image and the photographed image of which the size is adjusted is displayed according to whether the manual focusing mode is selected.

25. The device of claim 15, further comprising:
a switching unit for performing a switching operation so that one of the output captured image and the photographed image of which the size is adjusted is displayed according to whether the manual focusing mode is selected.

* * * * *